United States Patent
Xu et al.

(10) Patent No.: US 12,376,153 B2
(45) Date of Patent: Jul. 29, 2025

(54) SIGNALING FOR CHANNEL OCCUPANCY TIME SHARING IN FRAME BASED EQUIPMENT MODE

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 17/757,129

(22) PCT Filed: Dec. 24, 2019

(86) PCT No.: PCT/CN2019/127759
§ 371 (c)(1),
(2) Date: Jun. 9, 2022

(87) PCT Pub. No.: WO2021/127960
PCT Pub. Date: Jul. 1, 2021

(65) Prior Publication Data
US 2023/0007688 A1 Jan. 5, 2023

(51) Int. Cl.
*H04W 74/0816* (2024.01)
*H04W 24/08* (2009.01)

(52) U.S. Cl.
CPC ....... *H04W 74/0816* (2013.01); *H04W 24/08* (2013.01)

(58) Field of Classification Search
CPC .. H04W 74/0816; H04W 24/08; H04W 74/04
See application file for complete search history.

(56) References Cited

U.S. PATENT DOCUMENTS 10,820,316 B2    10/2020 Zhang et al.
2014/0003314 A1   1/2014 Shu et al.
(Continued)

FOREIGN PATENT DOCUMENTS

CN    105578573 A    5/2016
CN    106922032 A    7/2017
(Continued)

OTHER PUBLICATIONS

Motorola, et al., "Feature Lead Summary #2 for NR-U DL Signals and Channels", 3GPP TSG RAN WG1#99, R1-1913416, 3rd Generation Partnership Project, Mobile Competence Centre, 650, Route Des Lucioles, F-06921 Sophia-Antipolis Cedex, France, vol. RAN WG1, No. Reno, United States, Nov. 18, 2019-Nov. 22, 2019, Nov. 25, 2019, 35 Pages, XP051830695, Chapters 3 and 4, p. 10-p. 21.
(Continued)

*Primary Examiner* — Yu-Wen Chang
(74) *Attorney, Agent, or Firm* — Harrity & Harrity, LLP

(57) ABSTRACT

Various aspects of the present disclosure generally relate to signaling in frame-based equipment (FBE) mode for channel occupancy time (COT) sharing. In some aspects, a user
(Continued)

equipment (UE) may receive, in association with an FBE mode, a message associated with a designation of the UE for either COT sharing or non-COT sharing. The UE may detect whether there is an initial signal at a boundary of a time frame for COT and sleep, monitor, or communicate during the time frame, based at least in part on the designation and the detecting. Numerous other aspects are provided.

32 Claims, 11 Drawing Sheets

(56) References Cited

U.S. PATENT DOCUMENTS

| | | | |
|---|---|---|---|
| 2016/0227425 | A1 | 8/2016 | Kim et al. |
| 2018/0092043 | A1 | 3/2018 | Yerramalli et al. |
| 2020/0220673 | A1* | 7/2020 | Chang ............... H04W 16/14 |
| 2021/0112536 | A1* | 4/2021 | Shah ............... H04W 74/0808 |
| 2022/0104199 | A1* | 3/2022 | Liu ............... H04W 48/16 |
| 2022/0159723 | A1* | 5/2022 | Jiang ............... H04W 74/0866 |
| 2022/0167407 | A1* | 5/2022 | Oviedo ............ H04W 74/0808 |
| 2022/0167423 | A1* | 5/2022 | Aldana ............ H04W 74/0841 |
| 2022/0174741 | A1* | 6/2022 | Myung ............. H04W 72/0453 |
| 2022/0183053 | A1* | 6/2022 | Li ............... H04W 74/0808 |
| 2022/0201750 | A1* | 6/2022 | Wu ............... H04W 74/0808 |
| 2022/0210823 | A1* | 6/2022 | Alfarhan ............... H04L 1/1822 |
| 2022/0210827 | A1* | 6/2022 | Wang ............... H04W 74/08 |
| 2022/0377790 | A1* | 11/2022 | Awadin ............... H04W 74/006 |

FOREIGN PATENT DOCUMENTS

| | | |
|---|---|---|
| CN | 109076558 A | 12/2018 |
| WO | 2018106370 | 6/2018 |

OTHER PUBLICATIONS

Nokia, et al., "Feature Lead's Summary #2 on Channel Access Procedures", 3GPP TSG RAN WG1 Meeting #98bis, R1-1911706, 3rd Generation Partnership Project, Mobile Competence Centre, 650, Route Des Lucioles, F-06921 Sophia-Antipolis Cedex, France, vol. RAN WG1, No. Chongqing, P.R. China, Oct. 14, 2019-Oct. 20, 2019, Oct. 22, 2019, 27 Pages, XP051798948, Chapter 5 Channel access mechanism details for FBE, Chapter 6 UE to gNB COT sharing, p. 15-p. 19.

Supplementary European Search Report—EP19957234—Search Authority—Jul. 12, 2023.

ZTE, et al., "Considerations on DL Reference Signals and Channels Design for NR-U", 3GPP TSG RAN WG1 Meeting #98bis, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 7, 2019, 8 Pages, XP051808913, Chapter 2.2 UE COT detection for FBE, Chapter 2.3 COT Structure Indication.

Huawei, Hisilicon: "Coexistence and Channel Access for NR Unlicensed Band Operations", 3GPP TSG RAN WG1 Meeting #98bis, R1-1910045, Chongqing, China, Oct. 14-20, 2019, 18 Pages.

International Search Report and Written Opinion—PCT/CN2019/127759—ISA/EPO—Sep. 27, 2020.

* cited by examiner

SIGNALING FOR CHANNEL OCCUPANCY TIME SHARING IN FRAME BASED EQUIPMENT MODE

CROSS-REFERENCE TO RELATED APPLICATION

This application is a 35 U.S.C. § 371 U.S. national stage entry of International Application PCT/CN2019/127759, having an international filing date of Dec. 24, 2019, entitled "SIGNALING FOR CHANNEL OCCUPANCY TIME SHARING IN FRAME BASED EQUIPMENT MODE," which is hereby expressly incorporated by reference herein.

FIELD OF THE DISCLOSURE

Aspects of the present disclosure generally relate to wireless communication and to techniques and apparatuses for signaling for channel occupancy time sharing in frame based equipment mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, in association with a frame-based equipment (FBE) mode, a message associated with a designation of the UE for either channel occupancy time (COT) sharing or non-COT sharing. The method may include detecting whether there is an initial signal at a boundary of a time frame for COT. The method may include one or more of sleeping, monitoring, or communicating during the time frame, based at least in part on the designation and the detecting.

In some aspects, a method of wireless communication, performed by a device, may include determining a designation of another device for COT sharing or non-COT sharing in an FBE mode, based at least in part on one or more parameters associated with communication by the other device. The method may include performing an action based at least in part on the designation.

In some aspects, a UE for wireless communication may include memory and one or more processors operatively coupled to the memory. The memory and the one or more processors may be configured to receive, in association with an FBE mode, a message associated with a designation of the UE for either COT sharing or non-COT sharing. The memory and the one or more processors may detect whether there is an initial signal at a boundary of a time frame for COT and one or more of sleep, monitor, or communicate during the time frame, based at least in part on the designation and the detecting.

In some aspects, a device, such as a base station, for wireless communication may include memory and one or more processors operatively coupled to the memory. The memory and the one or more processors may be configured to determine a designation of another device for COT sharing or non-COT sharing in an FBE mode, based at least in part on one or more parameters associated with communication by the other device, and perform an action based at least in part on the designation.

In some aspects, a non-transitory computer-readable medium may store one or more instructions for wireless communication. The one or more instructions, when executed by one or more processors of a UE, may cause the one or more processors to receive, in association with an FBE mode, a message associated with a designation of the UE for either COT sharing or non-COT sharing. The one or more instructions, when executed by the one or more processors of the UE, may cause the one or more processors to detect whether there is an initial signal at a boundary of a time frame for COT and one or more of sleep, monitor, or communicate during the time frame, based at least in part on the designation and the detecting.

In some aspects, a non-transitory computer-readable medium may store one or more instructions for wireless communication. The one or more instructions, when executed by one or more processors of a device, such as a base station, may cause the one or more processors to determine a designation of another device for COT sharing or non-COT sharing in an FBE mode, based at least in part on one or more parameters associated with communication by the other device, and perform an action based at least in part on the designation.

In some aspects, an apparatus for wireless communication may include means for receiving, in association with an FBE mode, a message associated with a designation of the apparatus for either COT sharing or non-COT sharing, means for detecting whether there is an initial signal at a boundary of a time frame for COT, and means for one or more of sleeping, monitoring, or communicating during the time frame, based at least in part on the designation and the detecting.

In some aspects, an apparatus for wireless communication may include means for determining a designation of another device for COT sharing or non-COT sharing in an FBE mode, based at least in part on one or more parameters associated with communication by the other device, and means for performing an action based at least in part on the designation.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
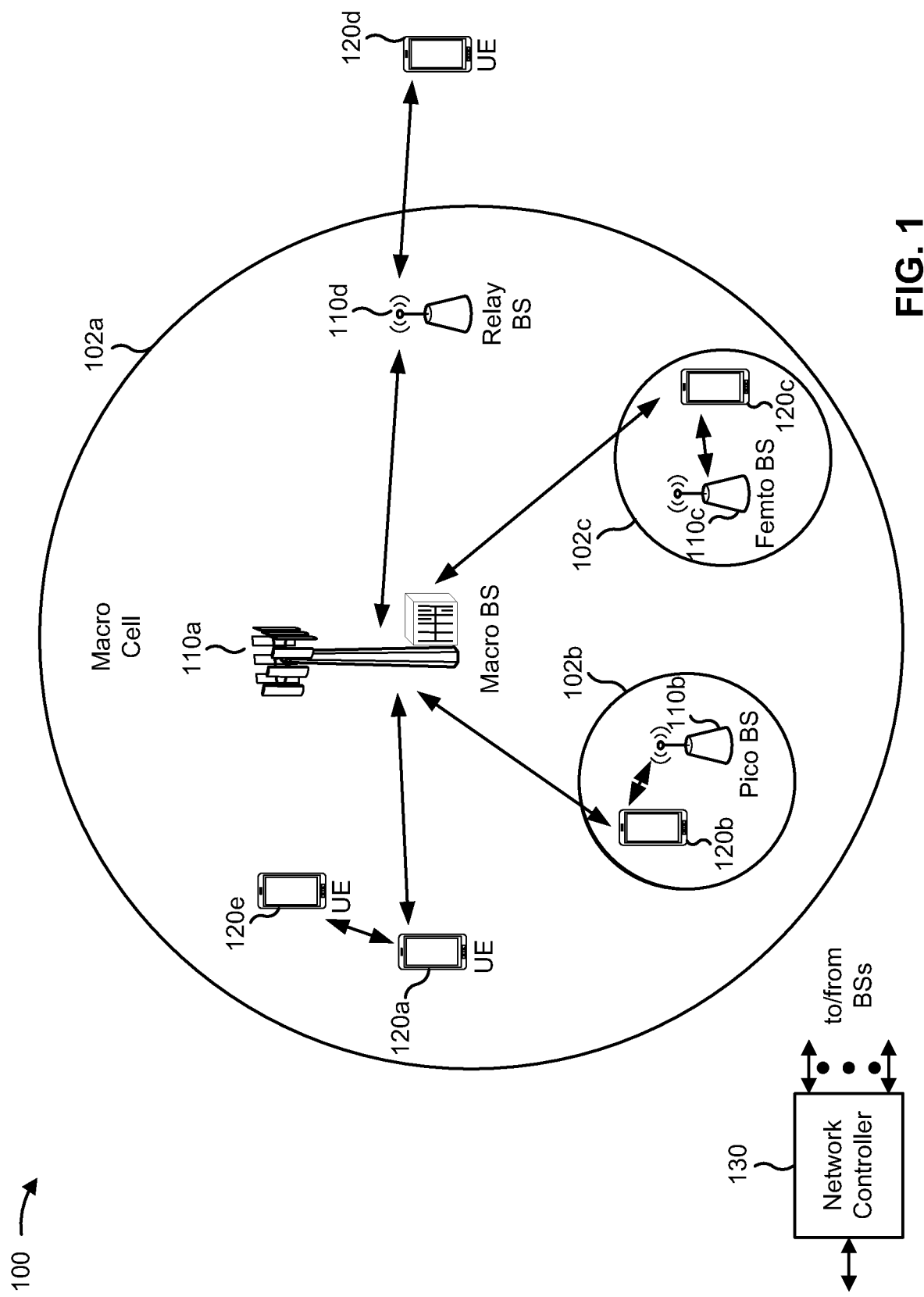
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATS. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
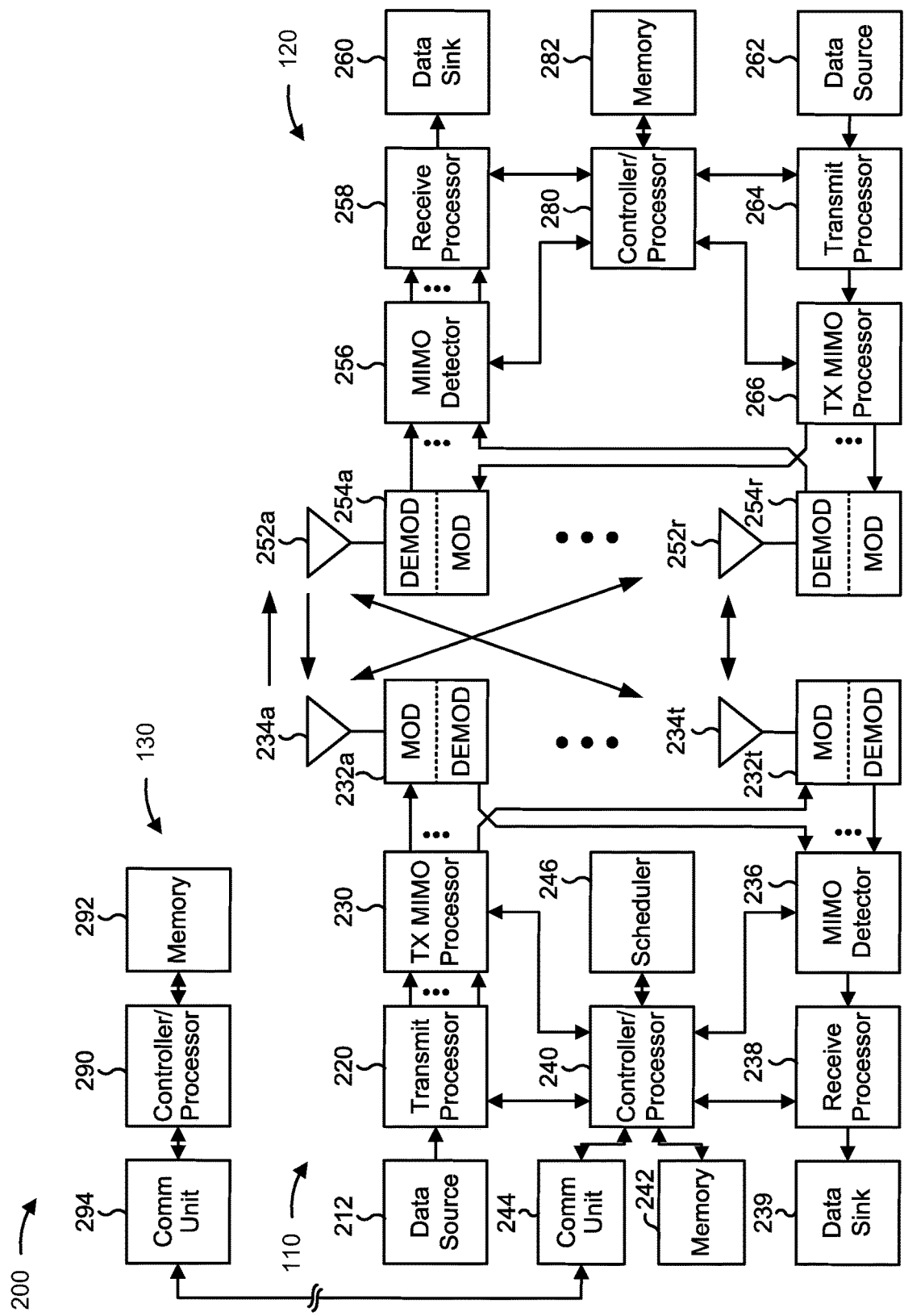
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with signaling for COT sharing in FBE mode, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 900 of FIG. 9, process 1000 of FIG. 10, and/or other processes as described herein. A scheduler 246 may schedule UEs for data transmission on the downlink and/or uplink.

In some aspects, UE 120 may include means for receiving, in association with a frame-based equipment mode, a message associated with a designation of the UE for either COT sharing or non-COT sharing, means for detecting whether there is an initial signal at a boundary of a time frame for COT, means for one or more of sleeping, monitoring, or communicating during the time frame, based at least in part on the designation and the detecting, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a designation of another device for COT sharing or non-COT sharing in an FBE mode, based at least in part on one or more parameters associated with communication by the other device, means for performing an action based at least in part on the designation, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3A:
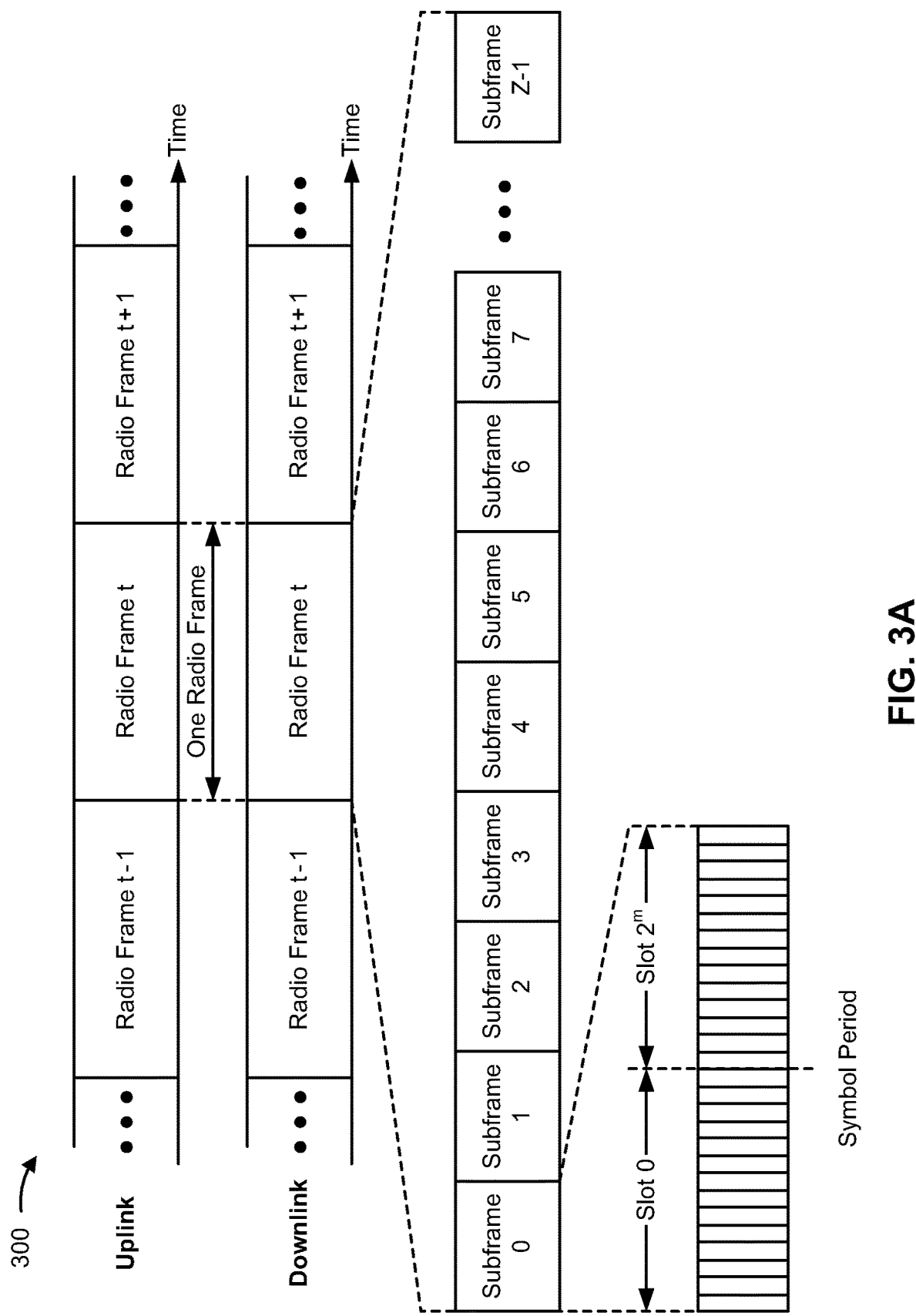
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2 m slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
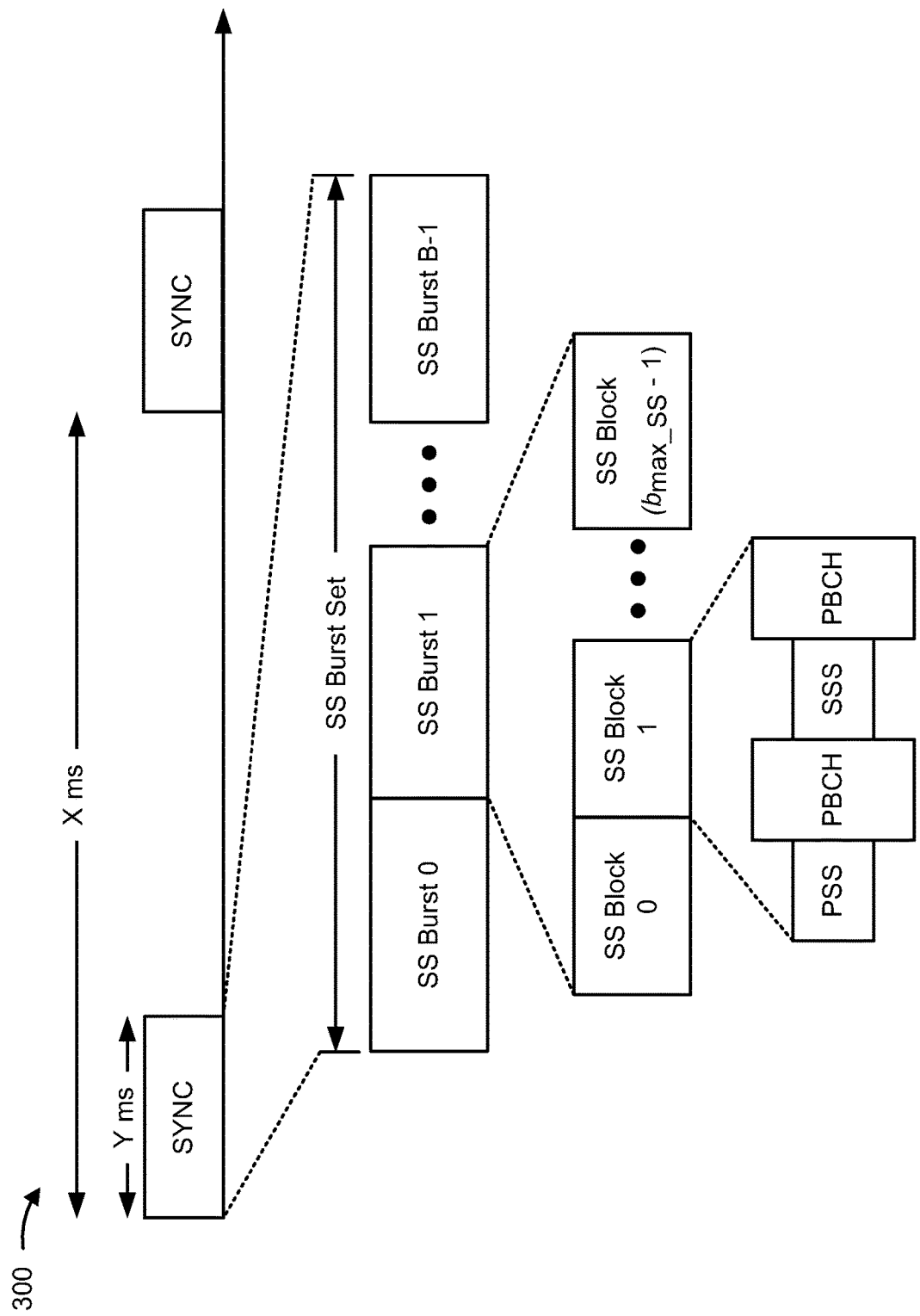
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
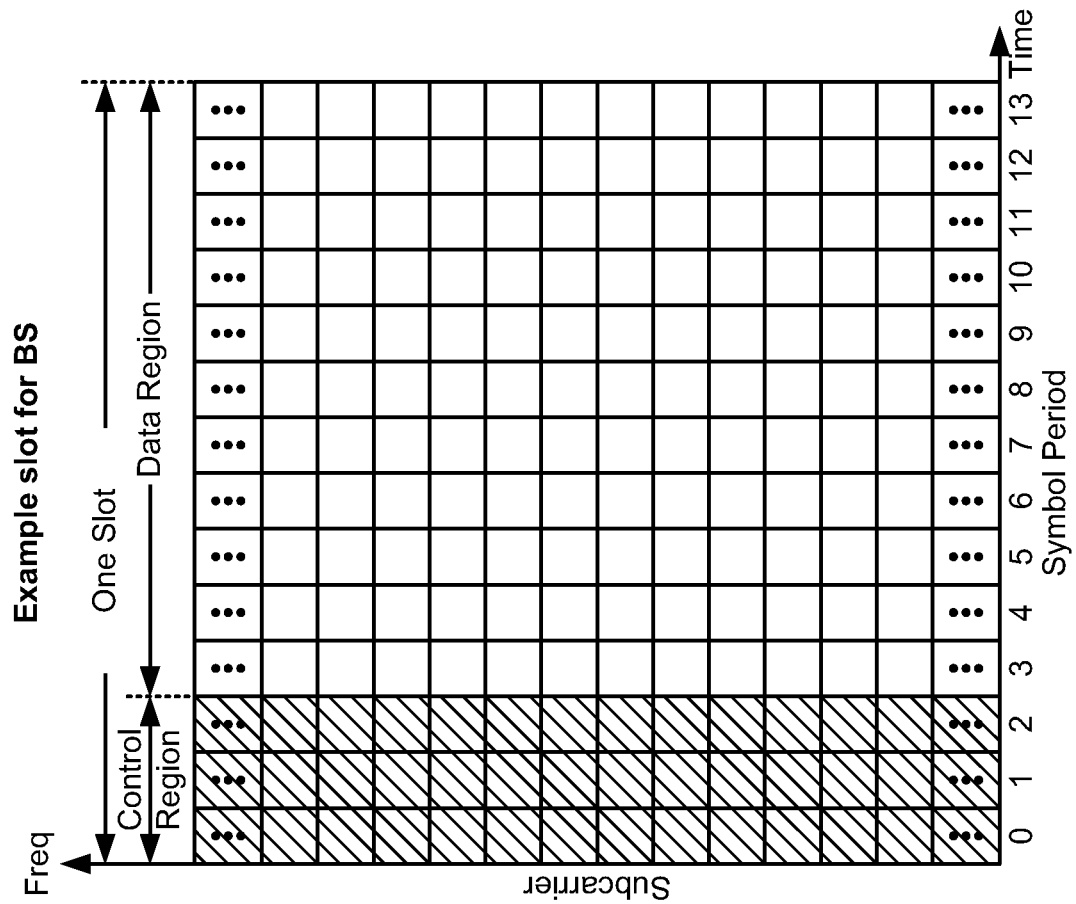
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q ∈ {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

A wireless network may operate on one or more frequencies, which also may be referred to as carriers or frequency channels. Some carriers for wireless communication are licensed carriers. Cellular networks, such as an LTE network or a 5G network, may use licensed carriers. Wireless local area networks, or Wi-Fi networks, may use unlicensed carriers. 5G networks may utilize License Assisted Access (LAA), which leverages unlicensed carriers in combination with licensed carriers to improve performance for UEs.

Transmissions on unlicensed carriers may require a transmitting device, such as a UE, to determine whether a carrier (frequency channel) is clear for transmission. Listen Before Talk (or listen before transmit) (LBT) is a mechanism by which a device should apply a clear channel assessment (CCA) check (i.e., spectrum sensing for a certain period, called the CCA period) before using the channel. CCA uses energy detection (ED) to detect the presence (channel is busy) or absence (channel is clear) of other signals on the channel. If the detected energy during an initial CCA period is lower than a certain threshold (the ED threshold), the device can access the channel for a period called a channel occupancy time (COT). Otherwise, an extended CCA period starts, in which the detected energy is again compared against the ED threshold until channel access is granted.

COT sharing is a mechanism where one device acquires a COT using one LBT and another device shares the COT using another LBT. A duration of the COT may be limited by a maximum COT limit. A purpose of COT sharing is to allow a concession for LAA uplink in which one device (e.g., eNB) may send a grant to another device (e.g., UE) before the UE can transmit an uplink communication.

COT sharing may involve two devices sharing a time resource, such as a frame in a frame based equipment (FBE) mode. Although FBE mode involves unlicensed frequency bands, the FBE mode may have a fixed frame period rather than being demand driven. A device in FBE mode may perform a CCA using ED for a channel observation time. If the channel is clear, the device may transmit with a COT, during which there is no need to re-evaluate the channel. The device may perform a new CCA for a next frame. If the channel is not clear, the device may remain quiet for the next frame. The device may perform CCA once every frame, and a channel access opportunity may be once every frame.

COT sharing may be used for transmissions from a UE to a base station (e.g., gNB). In FBE mode, without COT sharing, the UE is able to sleep until a next frame if the UE does not detect an initial signal at the frame boundary. With COT sharing, a UE may not be able to go to sleep at all. For example, with UE to gNB COT sharing, a UE may be awake to share a frame of a COT with the gNB. With gNB to gNB COT sharing, if one gNB fails LBT at a frame boundary, the gNB may join the other gNB's frame (with a single shot LBT). With gNB to gNB COT sharing, a non-sharing UE may need to monitor downlink control signals and broadcast signals. In other words, if COT sharing is not applicable to a UE (e.g., no low latency requirement, not high data throughput), a UE may not be aware of this and may otherwise stay awake to monitor for signals or expect to share a frame of a COT. The UE may waste power as well as processing and signaling resources by missing sleeping opportunities in the context of COT sharing in FBE mode.

According to various aspects described herein, a base station may indicate information about COT sharing to UEs so that the UEs have more information to determine when to go to sleep, when to monitor for signals, or when to communicate with the base station. In this way, the UEs may take advantage of sleep opportunities and spend less time on activities that consume power and processing and signaling resources.

In some aspects, a base station may divide UEs into two categories based on parameters such as a quality of service (QoS) requirement. For UEs that require a high QoS, which is important for transmissions with a low latency requirement or a high data rate, or for transmissions for certain services, the base station may designate these UEs as belonging to a first category that is COT sharing. The remaining UEs may form a second category, where there is no COT sharing. UEs in the second category may sleep more and save power.

Figure 5:
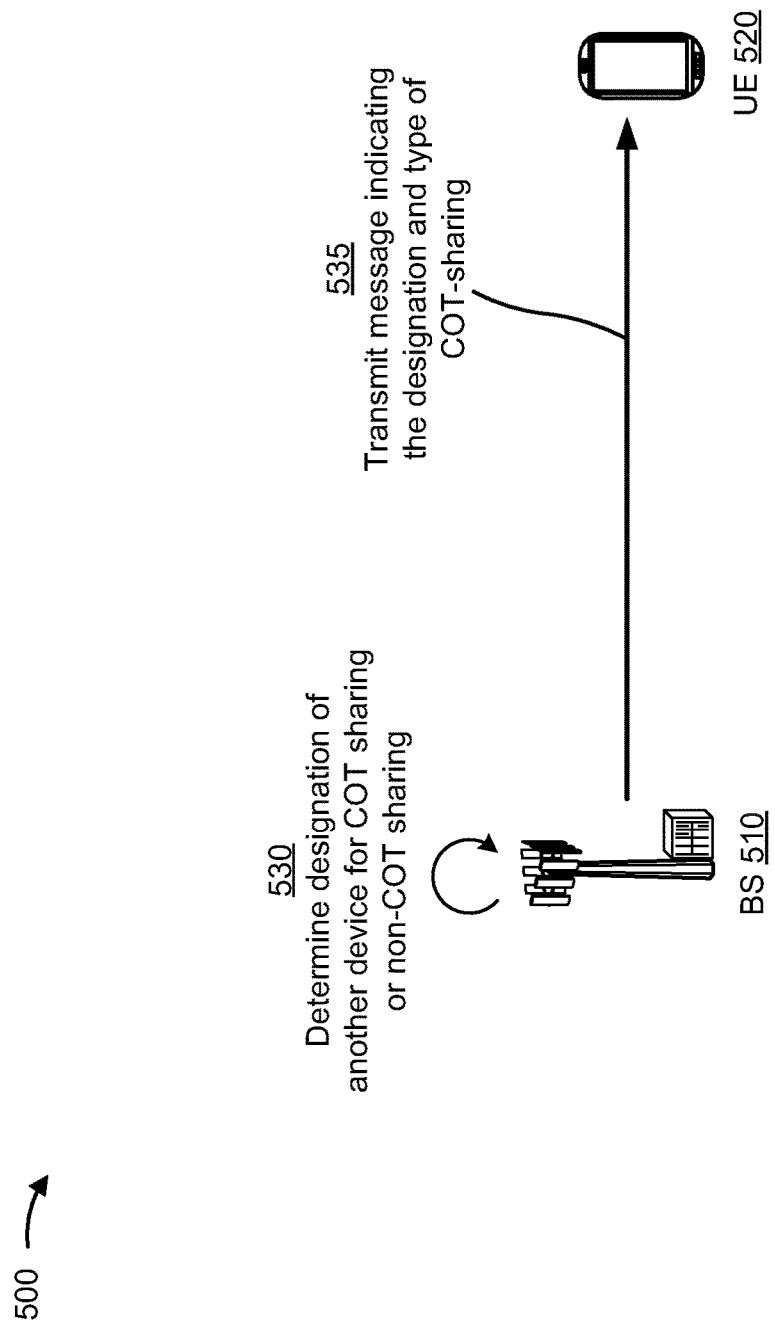
FIG. 5 is a diagram illustrating an example of signaling for COT sharing in FBE mode, in accordance with various aspects of the present disclosure.

FIG. 5 is a diagram illustrating an example 500 of signaling for COT sharing in FBE mode, in accordance with various aspects of the present disclosure. FIG. 5 shows a BS 510 (e.g., BS 110 depicted in FIGS. 1 and 2) that may communicate with a UE 520 (e.g., UE 120 depicted in FIGS. 1 and 2).

As shown by reference number 530, BS 510 may determine a designation of another device (e.g., a UE, a gNB) for COT sharing or non-COT sharing in an FBE mode, based at least in part on one or more parameters associated with communication by the other device. The parameters may include a QoS requirement, a latency requirement, an amount of data, a type of service, and/or the like.

In some aspects, the UEs in the first category may not have any control information or data associated with different types of COT sharing. For a UE in FBE mode in the first category, the UE may enter sleep mode for a COT time, such as a transmission time frame, until a next frame, if the UE does not detect an initial signal at a boundary of the frame (beginning detection occasion or occasions of the frame). The UE may save power in this case.

In some aspects, the UEs in the second category may be expected to receive some control information or data from different types of COT sharing. The UEs may receive a designation for COT sharing and receive an indication, by a radio resource control (RRC) configuration message or a downlink control information (DCI) message, of a type of COT sharing. Type 0, for example, is a type of COT sharing that may include UE to gNB COT sharing. For Type 0 COT sharing, UE 520 may need to monitor downlink control signals and broadcast signals. UE 520 may monitor for the downlink control signals and the broadcast signals with a limited number of symbols. For example, UE 520 may monitor fewer symbols, such as 2 symbols for a subcarrier spacing (SCS) of 15 kHz, 4 symbols for an SCS of 30 kHz, and 8 symbols for an SCS of 60 kHz. Type 1 COT sharing may include TRP to TRP COT sharing, or gNB to gNB COT sharing. Type 2 COT sharing may include both Type 0 and Type 1 COT sharing.

As shown by reference number 535, BS 510 may transmit a message to UE 520 indicating the designation and the type of the COT sharing. For example, the designation may be for COT sharing, and the type of COT sharing may be Type 0 (e.g., UE to gNB COT sharing). In this example, UE 520 may go to sleep, monitor for signals, or communicate with BS 510, based at least in part on messages that UE 520 receives or signals that UE 520 detects.

As indicated above, FIG. 5 is provided as an example. Other examples may differ from what is described with regard to FIG. 5.

Figure 6:
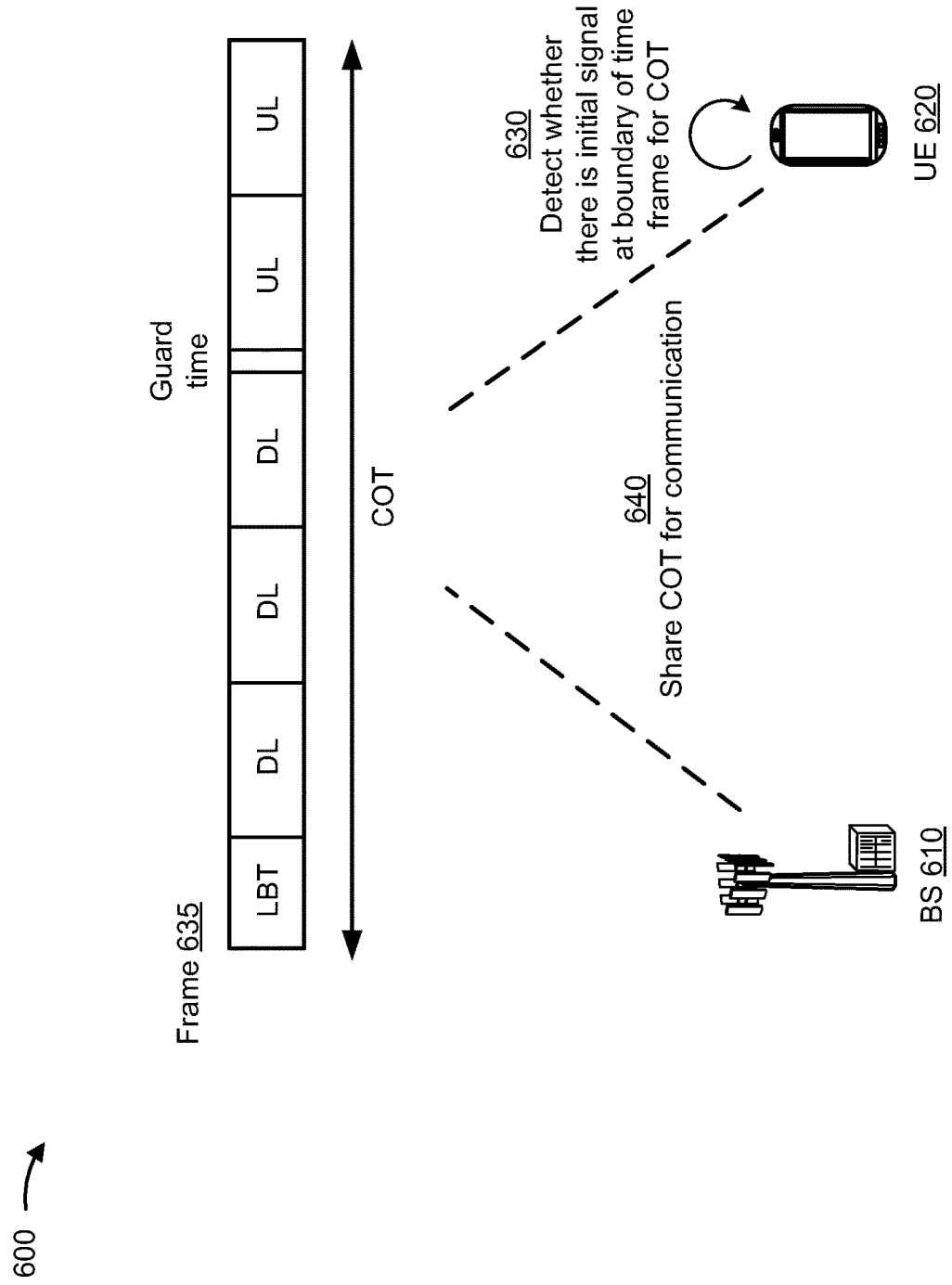
FIG. 6 illustrates an example of signaling for COT sharing in FBE mode, in accordance with various aspects of the present disclosure.

FIG. 6 illustrates an example 600 of signaling for COT sharing in FBE mode, in accordance with various aspects of the present disclosure. FIG. 6 shows a BS 610 (e.g., BS 110, BS 510) that may communicate with a UE 620 (e.g., UE 120, UE 520). BS 610 and UE 620 may be in FBE mode and communications may be frame-based.

In some aspects, UE 620 may monitor for signals on a frequency band and act based at least in part on information about COT sharing that UE 620 received from BS 610. For example, the information may indicate UE to gNB COT sharing (e.g., Type 0) for UE 620. As shown by reference number 630, UE 620 may detect, as part of an LBT procedure, whether there is an initial signal at a boundary of a time frame 635 for a COT shared between BS 610 and UE 620. The initial signal may be at a beginning of frame 635, such as an LBT/CCA period, a first detection occasion, a second detection occasion, and/or the like.

As shown by reference number 640, UE 620 may share frame 635 of the COT with BS 610. BS 610 may transmit or receive communications in frame 635. Some of these communications may be with UE 620 or with other devices. UE 620 may transmit or receive communications in frame 635. Some of these communications may be with BS 610 or with other devices. Frame 635 shows, for example, BS 610 transmitting downlink messages, a guard time, and then UE 620 transmitting uplink messages.

In some aspects, if UE 620 receives a designation of non-COT sharing, UE 620 may detect whether the initial signal is at the boundary of frame 635. If UE 620 does not detect a signal, UE 620 may enter sleep mode for frame 635. If UE 620 is designated for COT sharing, UE 620 may stay awake for transmitting or receiving communications during frame 635.

As indicated above, FIG. 6 is provided as an example. Other examples may differ from what is described with regard to FIG. 6.

Figure 7:
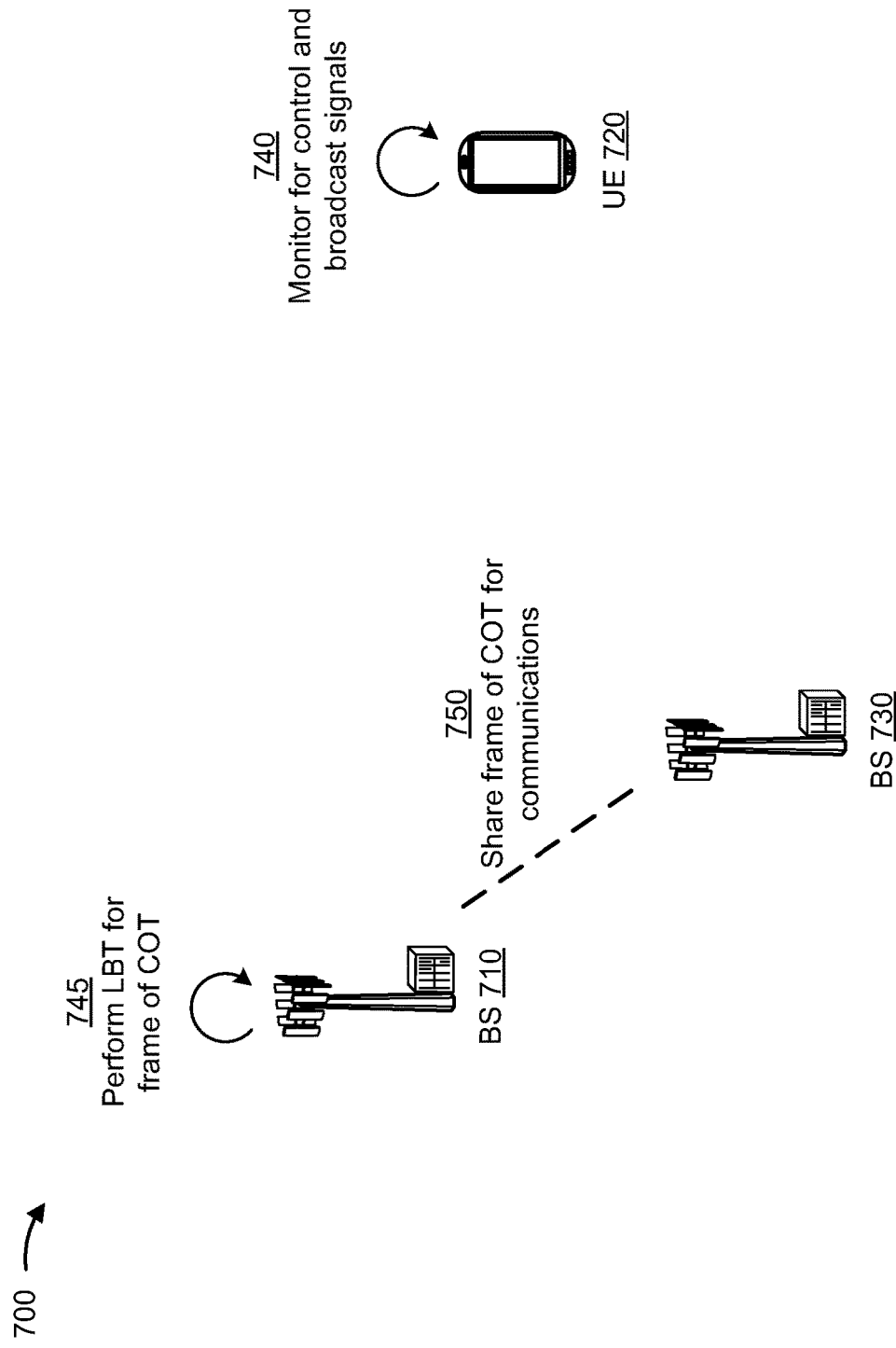
FIG. 7 illustrates an example of signaling for COT sharing in FBE mode, in accordance with various aspects of the present disclosure.

FIG. 7 illustrates an example 700 of signaling for COT sharing in FBE mode, in accordance with various aspects of the present disclosure. FIG. 7 shows a BS 710 (e.g., BS 110, BS 510) that may communicate with a UE 720 (e.g., UE 120, UE 520) and with another BS 730 (e.g., BS 110, BS 510). BS 710, UE 720, and UE 730 may be in FBE mode and communications may be frame-based.

In some aspects, a COT type of sharing may be gNB to gNB COT sharing (e.g., Type 1). As shown by reference number 740, UE 720 may be a non-sharing node that monitors for control signals and broadcast signals, based at least in part on receiving an indication of the COT type. As shown by reference number 745, BS 710 may perform an LBT procedure. If the LBT procedure is unsuccessful and the channel is not clear, BS 710 may share a frame of a COT with BS 730, as shown by reference number 750.

In some aspects, to save power, UE 720 may detect control signaling at predefined occasions in a time domain and sleep at a remaining time duration. UE 720 may be more efficient during gNB to gNB COT sharing.

As indicated above, FIG. 7 is provided as an example. Other examples may differ from what is described with regard to FIG. 7.

Figure 8:
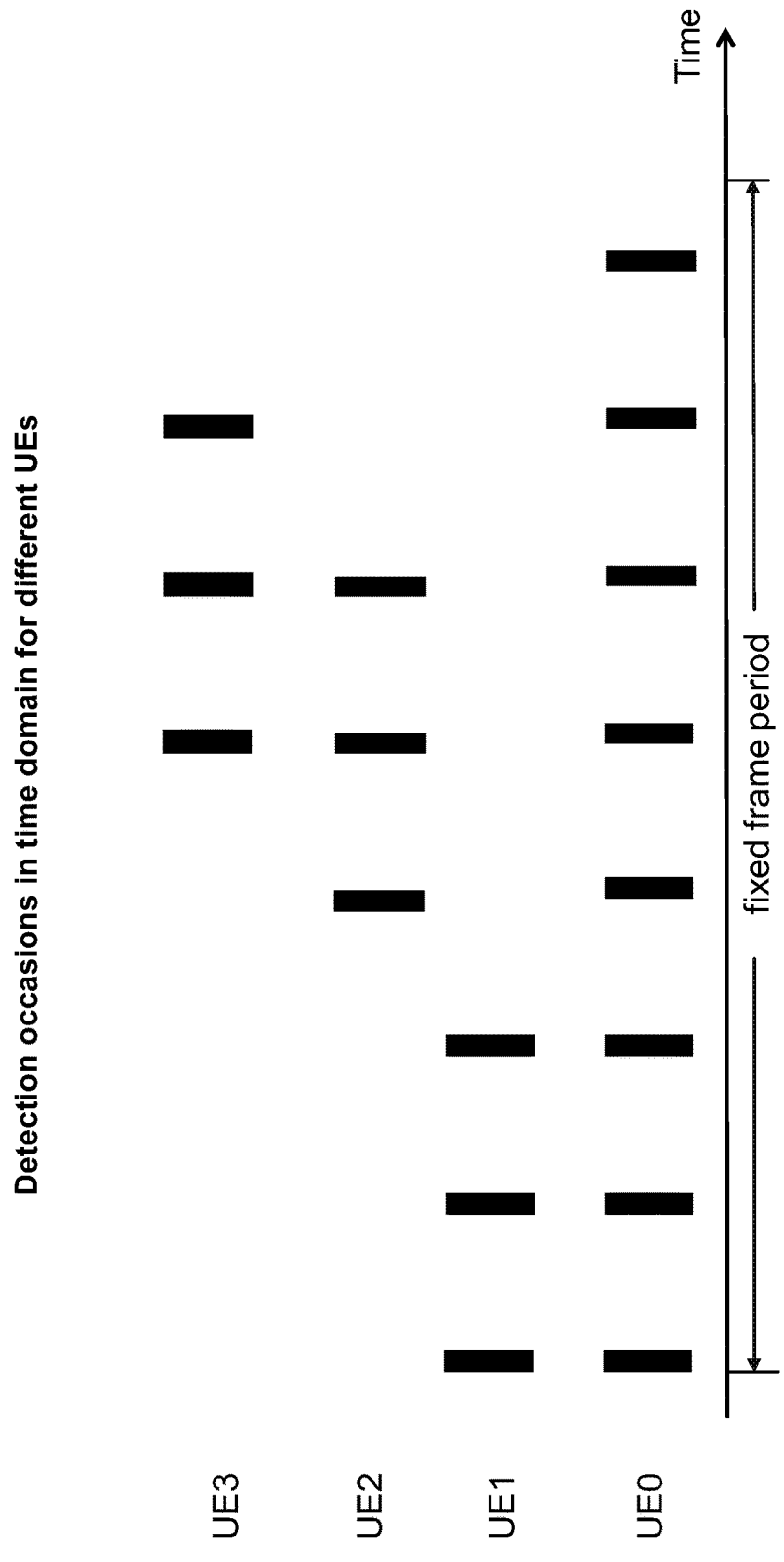
FIG. 8 illustrates an example of possible detection occasions in a frame of a COT, in accordance with various aspects of the present disclosure.

FIG. 8 illustrates an example 800 of possible detection occasions in a frame of a COT, in accordance with various aspects of the present disclosure.

In some aspects, multiple UEs may be configured with time patterns for occasions during a frame when a UE may monitor for and detect control signals and broadcast signals. For example, UE0 may have detection occasions throughout the frame. This may be because UE0 is involved in transmission of a large amount of data or transmission with a requirement of low latency. UE0 may need more detection occasions if UE0 is involved in high throughput services, low latency services, or both.

In some aspects, a base station may reduce or minimize a duration of a time pattern for a UE, to allow for a longer sleep time. For example, UE1 may monitor a first few detection occasions and if no control signals or broadcast signals are received to indicate that other signals may be forthcoming, UE1 may enter sleep mode for a remaining portion of the frame. In some aspects, a base station may configure UEs to monitor for signals at detection occasions that are in different portions of the frame. As shown by FIG. 8, UE1 may monitor for signals at a first few detection occasions, UE2 may monitor for signals at a few detection occasions after the first few detection occasions, and UE3 may monitor for signals at a few later detection occasions. In some aspects, the UEs may receive the time pattern via RRC or DCI messages. In this way, UEs with less need for COT sharing may be provided more certainty that they may not be involved in COT sharing, allowing for more sleep. In this way, UEs in FBE mode with information about COT sharing, as described above in connection with FIGS. 5-8, may be configured to have more opportunities for timely sleep, including during a frame of a COT. The UEs may save power as well as processing and signaling resources.

Figure 9:
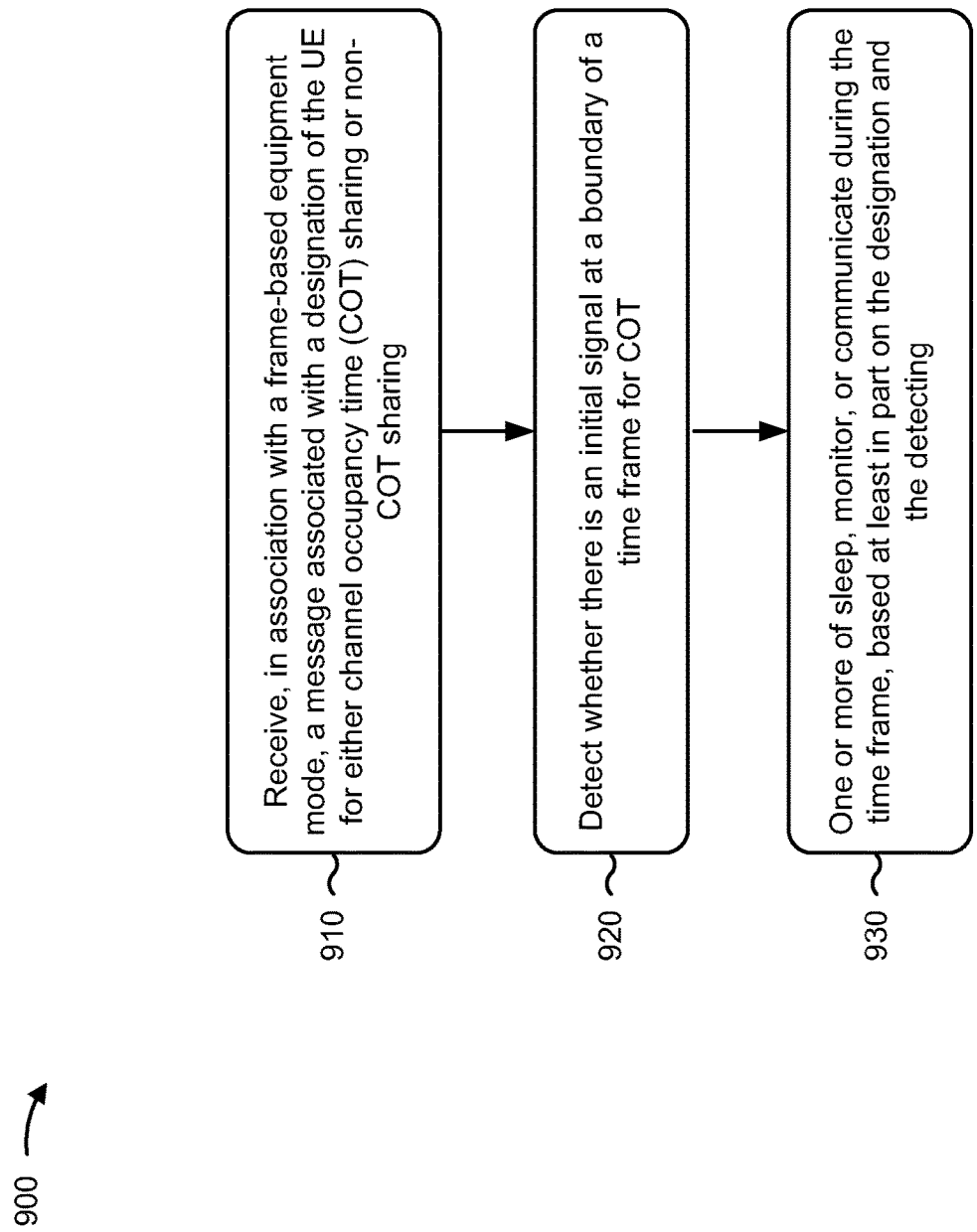
FIG. 9 is a diagram illustrating an example process performed, for example, by a UE, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120 depicted in FIGS. 1 and 2, UE 520 depicted in FIG. 5, and/or the like) performs operations associated with signaling for COT sharing in FBE mode.

As shown in FIG. 9, in some aspects, process 900 may include receiving, in association with a frame-based equipment mode, a message associated with a designation of the UE for either COT sharing or non-COT sharing (block 910). For example, the UE (e.g., using receive processor 258, transmit processor 264, controller/processor 280, memory 282, and/or the like) may receive, in association with a frame-based equipment mode, a message associated with a designation of the UE for either COT sharing or non-COT sharing, as described above.

As further shown in FIG. 9, in some aspects, process 900 may include detecting whether there is an initial signal at a boundary of a time frame for COT (block 920). For example, the UE (e.g., using receive processor 258, transmit processor 264, controller/processor 280, memory 282, and/or the like) may detect whether there is an initial signal at a boundary of a time frame for COT, as described above.

As further shown in FIG. 9, in some aspects, process 900 may include one or more of sleeping, monitoring, or communicating during the time frame, based at least in part on the designation and the detecting (block 930). For example, the UE (e.g., using receive processor 258, transmit processor 264, controller/processor 280, memory 282, and/or the like) may one or more of sleep, monitor, or communicate during the time frame, based at least in part on the designation and the detecting, as described above.

Process 900 may include additional aspects, such as any single aspect or any combination of aspects described below and/or in connection with one or more other processes described elsewhere herein.

In a first aspect, the designation is for non-COT sharing, and process 900 includes going to sleep during the time frame based at least in part on detecting that there is no initial signal at the boundary of the time frame.

In a second aspect, alone or in combination with the first aspect, the designation is for COT sharing and the message indicates a type of COT sharing.

In a third aspect, alone or in combination with one or more of the first and second aspects, the type of COT sharing is UE to base station COT sharing, and process 900 includes sharing the time frame with the base station, based at least in part on the type of COT sharing and based at least in part on detecting the initial signal at the boundary of the time frame.

In a fourth aspect, alone or in combination with one or more of the first through third aspects, the type of COT sharing is UE to base station COT sharing, and process 900 includes monitoring for control and broadcast signals with a limited subset of symbols during the time frame, based at least in part on the type of COT sharing.

In a fifth aspect, alone or in combination with one or more of the first through fourth aspects, the type of COT sharing is base station to base station COT sharing, and process 900 includes monitoring for control and broadcast signals at detection opportunities during the time frame, based at least in part on the type of COT sharing.

In a sixth aspect, alone or in combination with one or more of the first through fifth aspects, the monitoring includes monitoring for control and broadcast signals at a pattern of detection occasions, the pattern of detection occasions including a proper subset of the detection opportunities during the time frame. That is, the pattern of detection may include fewer detection occasions than there are possible detection opportunities during the time frame.

In a seventh aspect, alone or in combination with one or more of the first through sixth aspects, the pattern of detection occasions includes no more than half of the detection opportunities during the time frame.

In an eighth aspect, alone or in combination with one or more of the first through seventh aspects, the pattern of detection occasions starts after a first one or more of the detection opportunities during the time frame.

In a ninth aspect, alone or in combination with one or more of the first through eighth aspects, the type of COT sharing is both base station to base station COT sharing and UE to base station COT sharing, and the method further comprises monitoring for control and broadcast signals at detection opportunities during the time frame, based at least in part on the type of COT sharing.

In a tenth aspect, alone or in combination with one or more of the first through ninth aspects, the message is one or more of a radio resource control message or a downlink control information message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
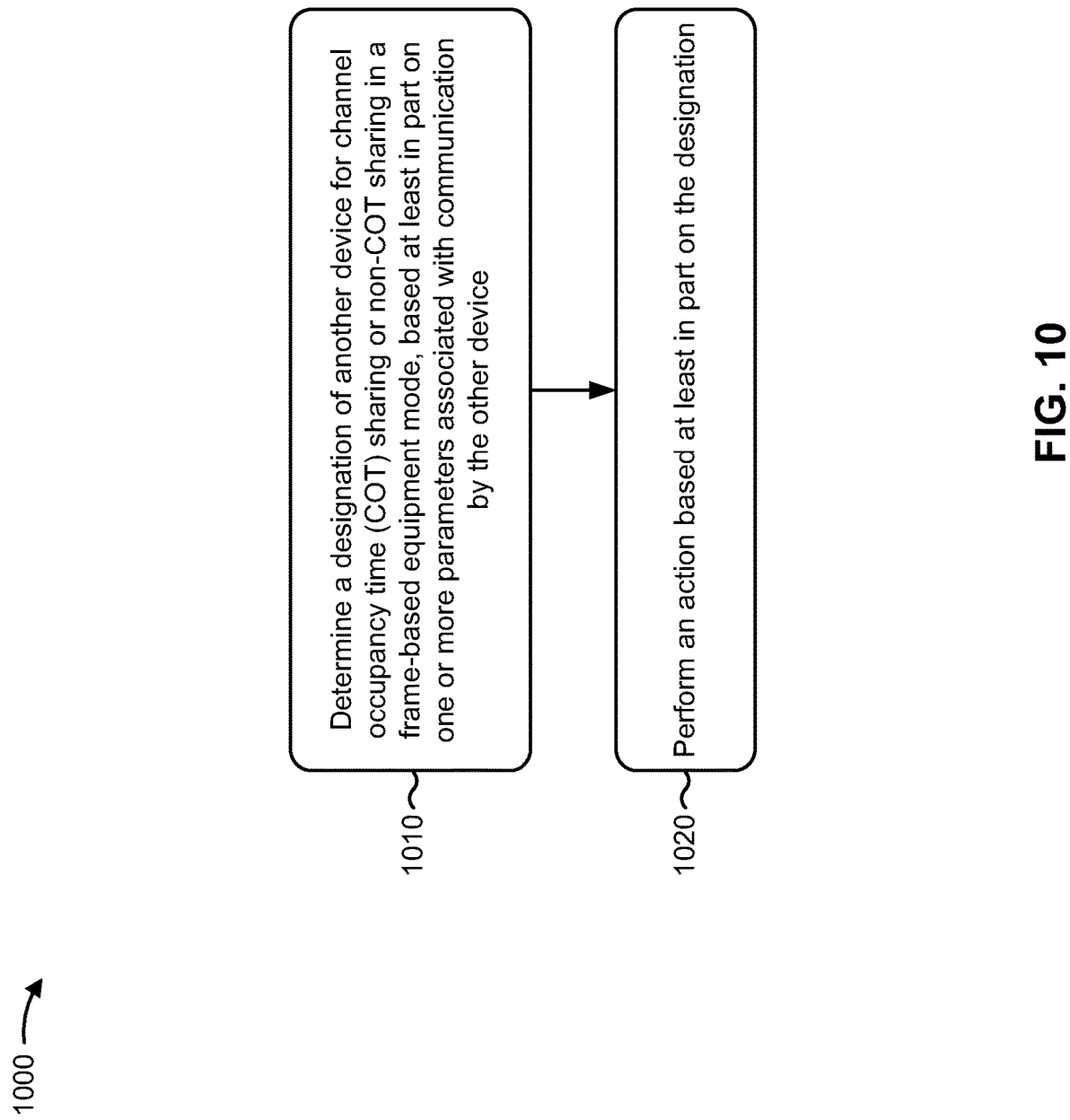
FIG. 10 is a diagram illustrating an example process performed, for example, by a device, in accordance with various aspects of the present disclosure.

FIG. 10 is a diagram illustrating an example process 1000 performed, for example, by a device, in accordance with various aspects of the present disclosure. Example process 1000 is an example where the device (e.g., BS 110 depicted in FIGS. 1 and 2, BS 510 depicted in FIG. 5, and/or the like) performs operations associated with signaling for COT sharing in FBE mode.

As shown in FIG. 10, in some aspects, process 1000 may include determining a designation of another device for COT sharing or non-COT sharing in an FBE mode, based at least in part on one or more parameters associated with communication by the other device (block 1010). For example, the device (e.g., using receive processor 238, transmit processor 220, controller/processor 240, memory 242, and/or the like) may determine a designation of another device for COT sharing or non-COT sharing in an FBE mode, based at least in part on one or more parameters associated with communication by the other device, as described above.

As further shown in FIG. 10, in some aspects, process 1000 may include performing an action based at least in part on the designation (block 1020). For example, the device (e.g., using receive processor 238, transmit processor 220, controller/processor 240, memory 242, and/or the like) may perform an action based at least in part on the designation, as described above.

Process 1000 may include additional aspects, such as any single aspect or any combination of aspects described below and/or in connection with one or more other processes described elsewhere herein.

In a first aspect, the device is a base station and the other device is a UE, the designation is for COT sharing, and performing the action includes transmitting a message to the UE indicating the designation and a type of the COT sharing.

In a second aspect, alone or in combination with the first aspect, the one or more parameters include one or more of a quality of service requirement, a latency requirement, or an amount of data.

In a third aspect, alone or in combination with one or more of the first and second aspects, the device is a base station, the designation is for COT sharing, and a type of COT sharing is UE to base station COT sharing, and performing the action includes sharing a time frame with the UE.

In a fourth aspect, alone or in combination with one or more of the first through third aspects, the device is a base station and the other device is a user equipment (UE), and performing the action includes generating an instruction for the UE to begin monitoring for a signal in a pattern of detection occasions among detection opportunities during a time frame for a COT, based at least in part on one or more of a comparison of an amount of data and a data threshold, or a comparison of a latency requirement and a latency threshold and transmitting the instruction to the UE.

In a fifth aspect, alone or in combination with one or more of the first through fourth aspects, the instruction includes an instruction to monitor for control and broadcast signals at a pattern of detection occasions, the pattern of detection occasions including a proper subset of the detection opportunities during the time frame.

In a sixth aspect, alone or in combination with one or more of the first through fifth aspects, the pattern of detection occasions includes no more than half of the detection opportunities during the time frame.

In a seventh aspect, alone or in combination with one or more of the first through sixth aspects, the pattern of detection occasions starts after a first one or more of the detection opportunities during the time frame.

In an eighth aspect, alone or in combination with one or more of the first through seventh aspects, the device and the other device are base stations, and performing the action includes performing an LBT procedure for a time frame for a COT shared by the other base station and sharing the time frame with the other base station, based at least in part on a determination that the LBT procedure is not successful.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving, in association with a frame-based equipment mode, a message associated with a designation of the UE for either channel occupancy time (COT) sharing or non-COT sharing;
detecting whether there is an initial signal at a boundary of a time frame for COT; and
one or more of:
sleeping during the time frame, based at least in part on the designation being for non-COT sharing, and based at least in part on detecting that there is no initial signal at the boundary of the time frame; or
monitoring or communicating during the time frame, based at least in part on the designation being for COT sharing and based at least in part on detecting that there is the initial signal at the boundary of the time frame, wherein the message indicates a type of COT sharing, and wherein the type of COT sharing is UE to base station COT sharing or base station to base station COT sharing.

2. The method of claim 1, wherein the type of COT sharing is UE to base station COT sharing, and wherein the method further comprises sharing the time frame with the base station, based at least in part on the type of COT sharing and based at least in part on detecting the initial signal at the boundary of the time frame.

3. The method of claim 1, wherein the type of COT sharing is UE to base station COT sharing, and wherein the method further comprises monitoring for control and broadcast signals with a limited subset of symbols during the time frame, based at least in part on the type of COT sharing.

4. The method of claim 1, wherein the type of COT sharing is base station to base station COT sharing, and wherein the method further comprises monitoring for control and broadcast signals at detection opportunities during the time frame, based at least in part on the type of COT sharing.

5. The method of claim 4, wherein the monitoring includes monitoring for control and broadcast signals at a pattern of detection occasions, the pattern of detection occasions including a proper subset of the detection opportunities during the time frame.

6. The method of claim 5, wherein the pattern of detection occasions includes no more than half of the detection opportunities during the time frame.

7. The method of claim 5, wherein the pattern of detection occasions starts after a first one or more of the detection opportunities during the time frame.

8. The method of claim 1, wherein the type of COT sharing is both base station to base station COT sharing and UE to base station COT sharing, and wherein the method further comprises monitoring for control and broadcast signals at detection opportunities during the time frame, based at least in part on the type of COT sharing.

9. The method of claim 1, wherein the message is one or more of a radio resource control message or a downlink control information message.

10. The method of claim 1, wherein the designation is based on one or more parameters associated with communication by the UE, wherein the one or more parameters include one or more of a quality of service requirement, a latency requirement, or an amount of data.

11. A method of wireless communication performed by a device, comprising:
 determining a designation of another device for channel occupancy time (COT) sharing or non-COT sharing in a frame-based equipment mode, based at least in part on one or more parameters associated with communication by the other device;
 transmitting a message indicating a designation of the other device for either channel occupancy time (COT) sharing, wherein the message indicates a type of COT sharing and wherein the type of COT sharing is user equipment (UE) to base station COT sharing or base station to base station COT sharing, or non-COT sharing; and
 performing an action based at least in part on the designation.

12. The method of claim 11, wherein the one or more parameters include one or more of a quality of service requirement, a latency requirement, or an amount of data.

13. The method of claim 11, wherein the device is a base station, the designation is for COT sharing, and a type of COT sharing is UE to base station COT sharing, and wherein performing the action includes sharing a time frame with the UE.

14. The method of claim 11, wherein the device is a base station and the other device is a UE, and wherein performing the action includes:
 generating an instruction for the UE to begin monitoring for a signal in a pattern of detection occasions among detection opportunities during a time frame for a COT, based at least in part on one or more of a comparison of an amount of data and a data threshold, or a comparison of a latency requirement and a latency threshold; and
 transmitting the instruction to the UE.

15. The method of claim 14, wherein the instruction includes an instruction to monitor for control and broadcast signals at a pattern of detection occasions, the pattern of detection occasions including a proper subset of the detection opportunities during the time frame.

16. The method of claim 15, wherein the pattern of detection occasions includes no more than half of the detection opportunities during the time frame.

17. The method of claim 15, wherein the pattern of detection occasions starts after a first one or more of the detection opportunities during the time frame.

18. The method of claim 11, wherein the device and the other device are base stations, and wherein performing the action comprises:
 performing a listen before talk (LBT) procedure for a time frame for a COT shared by the other base station; and
 sharing the time frame with the other base station, based at least in part on a determination that the LBT procedure is not successful.

19. A user equipment (UE) for wireless communication, comprising:
 a memory; and
 one or more processors coupled to the memory and configured to:
  receive, in association with a frame-based equipment mode, a message associated with a designation of the UE for either channel occupancy time (COT) sharing or non-COT sharing;
  detect whether there is an initial signal at a boundary of a time frame for COT; and
  one or more of:
   sleep during the time frame, based at least in part on the designation being for non-COT sharing, and based at least in part on detecting that there is no initial signal at the boundary of the time frame; or
   monitor or communicate during the time frame, based at least in part on the designation being for COT sharing and based at least in part on detecting that there is the initial signal at the boundary of the time frame, wherein the message indicates a type of COT sharing, and wherein the type of COT sharing is UE to base station COT sharing or base station to base station COT sharing.

20. The UE of claim 19, wherein the type of COT sharing is UE to base station COT sharing, and wherein the one or more processors are configured to share the time frame with the base station, based at least in part on the type of COT sharing and based at least in part on detecting the initial signal at the boundary of the time frame.

21. The UE of claim 19, wherein the type of COT sharing is UE to base station COT sharing, and wherein the one or more processors are configured to monitor for control and broadcast signals with a limited subset of symbols during the time frame, based at least in part on the type of COT sharing.

22. The UE of claim 19, wherein the type of COT sharing is base station to base station COT sharing, and wherein the one or more processors are configured to monitor for control and broadcast signals at detection opportunities during the time frame, based at least in part on the type of COT sharing.

23. The UE of claim 19, wherein the type of COT sharing is both base station to base station COT sharing and UE to base station COT sharing, and wherein the one or more processors are configured to monitor for control and broadcast signals at detection opportunities during the time frame, based at least in part on the type of COT sharing.

24. The UE of claim 19, wherein the designation is based on one or more parameters associated with communication by the UE, wherein the one or more parameters include one or more of a quality of service requirement, a latency requirement, or an amount of data.

25. The UE of claim 19, wherein the one or more processors, to monitor, are configured to:
monitor for control and broadcast signals at a pattern of detection occasions, the pattern of detection occasions including a proper subset of the detection occasions during the time frame.

26. The UE of claim 25, wherein the pattern of detection occasions includes no more than half of the detection occasions during the time frame.

27. The UE of claim 25, wherein the pattern of detection occasions starts after a first one or more of the detection occasions during the time frame.

28. The UE of claim 19, wherein the message is one or more of a radio resource control message or a downlink control information message.

29. A device for wireless communication, comprising:
a memory; and
one or more processors coupled to the memory and configured to:
determine a designation of another device for channel occupancy time (COT) sharing or non-COT sharing in a frame-based equipment mode, based at least in part on one or more parameters associated with communication by the other device;
transmit a message indicating a designation of the other device for either channel occupancy time (COT) sharing, wherein the message indicates a type of COT sharing and wherein the type of COT sharing is UE to base station COT sharing or base station to base station COT sharing, or non-COT sharing; and
perform an action based at least in part on the designation.

30. The device of claim 29, wherein the device is a base station and the other device is a UE and the designation is for COT sharing.

31. The device of claim 29, wherein the device is a base station, the designation is for COT sharing, and the type of COT sharing is to base station COT sharing, and wherein the one or more processors, to perform the action, are configured to share a time frame with the UE.

32. The device of claim 29, wherein the device is a base station and the other device is a UE, and wherein the one or more processors, to perform the action, are configured to:
generate an instruction for the UE to begin monitoring for a signal in a pattern of detection occasions among detection opportunities during a time frame for a COT, based at least in part on one or more of a comparison of an amount of data and a data threshold, or a comparison of a latency requirement and a latency threshold; and
transmit the instruction to the UE.

* * * * *